US012800352B2

(12) United States Patent
Torchio

(10) Patent No.: US 12,800,352 B2
(45) Date of Patent: Nov. 17, 2026

(54) LINEAR VARIABLE DIFFERENTIAL TRANSFORMER ARRANGEMENTS AND RELATED METHODS

(71) Applicant: Goodrich Corporation, Charlotte, NC (US)

(72) Inventor: Marcello Torchio, Glanmire (IE)

(73) Assignee: Goodrich Corporation, Charlotte, NC (US)

( * ) Notice: Subject to any disclaimer, the term of this patent is extended or adjusted under 35 U.S.C. 154(b) by 186 days.

(21) Appl. No.: 18/516,706

(22) Filed: Nov. 21, 2023

(65) Prior Publication Data

US 2024/0200986 A1 Jun. 20, 2024

(30) Foreign Application Priority Data

Dec. 15, 2022 (EP) .................................... 22213680

(51) Int. Cl.
*G01D 5/22* (2006.01)
*H01F 21/06* (2006.01)

(52) U.S. Cl.
CPC ........... *G01D 5/2291* (2013.01); *H01F 21/06* (2013.01)

(58) Field of Classification Search
None
See application file for complete search history.

(56) References Cited

U.S. PATENT DOCUMENTS 5,210,490 A * 5/1993 Munch ............ B60G 17/01933 324/207.13
5,422,555 A * 6/1995 Paige ..................... G01B 7/003 318/657
7,317,371 B1 1/2008 Carroll
2007/0024274 A1* 2/2007 Riedel .................. G01D 5/2291 324/207.18
2012/0326824 A1 12/2012 Harris
2016/0334245 A1* 11/2016 Esakki .................... H01F 21/06
(Continued)

FOREIGN PATENT DOCUMENTS

CN 108286932 7/2018

OTHER PUBLICATIONS

Saroj Kumar Mishra et al.; A Novel Method of Extending the Linearity Range of Linear Variable Differential Transformer Using Artificial Neural Network; IEEE Transactions on Instrumentation and Measurement, vol. 59, No. 4, Apr. 2010; pp. 947-953;Senior Member, IEEE, and Debi Prasad Das (Year: 2010).*
(Continued)

*Primary Examiner* — Nasima Monsur
(74) *Attorney, Agent, or Firm* — SNELL & WILMER L.L.P.

(57) ABSTRACT

An arrangement comprising a linear variable differential transformer including a core displaceable in a bore surrounded by a coil arrangement including a primary coil and secondary coils in a displacement range including a linear response range of the linear variable differential transformer, wherein the bore at least extends between a first position at a first end of the coil arrangement and a second position at a second end of the coil arrangement, and wherein the arrangement comprises a control unit configured to produce output signals corresponding to a plurality of positions of the core in the bore when an excitation current is supplied to the primary coil.

13 Claims, 5 Drawing Sheets

(56) References Cited

U.S. PATENT DOCUMENTS

| | | | | |
|---|---|---|---|---|
| 2017/0352464 | A1 | 12/2017 | Sanchihar et al. | |
| 2020/0378800 | A1* | 12/2020 | Yun | H01F 27/325 |

OTHER PUBLICATIONS

Mishra SK et al: "A Novel Method of Extending the Linearity Range of Linear Variable Differential Transformer Using Artificial Neural Network", IEEE Transactions on Instrumentation and Measurement, IEEE, USA, vol. 59, No. 4, Apr. 1, 2010, pp. 947-953, XP011296445, ISSN: 0018-9456.

Mishra SK et al: "A novel method for designing LVDT and its comparison with conventional design", Proc. of the Sensors Appl. Symposium, Houston, Texas. Feb. 9, 2006, IEEE, pp. 129-134, ISBN: 978-0-7803-9580-0.

EPO, European Extended Search Report dated May 24, 2023 in EP Serial No. 22213680.6.

* cited by examiner

LINEAR VARIABLE DIFFERENTIAL TRANSFORMER ARRANGEMENTS AND RELATED METHODS

CROSS-REFERENCE TO RELATED APPLICATIONS

This application claims priority to, and the benefit of, EP Patent Application No. 22213680.6, filed Dec. 15, 2022 and titled "LINEAR VARIABLE DIFFERENTIAL TRANSFORMER ARRANGEMENTS AND RELATED METHODS," which is incorporated by reference herein in its entirety for all purposes.

FIELD

The present disclosure relates to linear variable differential transformers (LVDTs).

BACKGROUND

LVDTs are sensors which are frequently used to measure the displacement between a reference frame and a moving part, and their functioning is generally known to the skilled person. LVDTs are widely employed across many industrial fields, such as oil and gas production and processing, automotive, aerospace, chemical plants, nuclear stations, etc. LVDTs generally comprise a high design robustness, (theoretically) infinite resolution, high accuracy and replicability, and the capability to work in extreme harsh environments.

The main drawback of LVDTs is generally related to their dimensions. Indeed, the Stroke to Length (STL) ratio—i.e., the ratio between the nominal operating region and the body length—of a conventional LVDT may, on average, be 50%. This means that the body may be required to be, on average, twice as long as the nominal operating region. This limitation has been tackled through the manufacturing of specialized "high stroke-to-length ratio" (HSTL) LVDTs whose bodies are 25-30% longer with respect to the linear operating region of the sensor. This is considered to represent an important factor in enabling the employment of LVDTs in limited spaces or volumes.

Despite the significant advances brought by HSTL sensors, not all LVDTs (i.e., with specific requirements on size, stroke, etc.) can be designed following that approach. For this reason, there is still a need for improvements in the field of constructing and operating LVDTs.

SUMMARY

A LVDT arrangement is proposed which, particularly by virtue of its electronics design and operational principles, comprises an improved operability beyond its nominal operating region or stroke (i.e., an increase of the STL ratio of the sensor). Aspects include a software-based solution that leverages a digital signal processing (DSP) component which may particularly be operated (for example, and in specific embodiments) using artificial intelligence or machine learning methods. Corresponding methods are also proposed.

According to one aspect disclosed herein, there is provided an arrangement comprising a LVDT including a core displaceable in a bore surrounded by a coil arrangement including a primary coil and secondary coils in a displacement range including a linear response range of the LVDT. The bore at least extends between a first position at a first end of the coil arrangement and a second position at a second end of the coil arrangement, and the arrangement comprises a control unit configured to produce output signals corresponding to a plurality of positions of the core in the bore when an excitation current is supplied to the primary coil.

In the linear response range, a linear relation of an electrical feature, parameter or characteristic, particularly a voltage as explained below, and the position of the core in the bore is generally observed. In the linear response range, a value y of the electrical feature, parameter or characteristic may generally be described by a linear relationship or equation such as $y=ax+b$, where x may denote the position of the core, a may denote as slope of the linear response, and b may be an offset. Obviously, as in all real-world applications, the electrical feature, parameter or characteristic may deviate in a certain range caused by measurement inaccuracies or electrical or mechanical variances from the value expected by the linear relationship, such a range being, e.g., ±10, ±5%, or ±1 percent.

In an arrangement as proposed according to said aspect, the displacement range is larger than the linear response range, and the plurality of positions include positions outside the linear response range. The control unit is configured to produce the output signals as output signals indicating the plurality of positions of the core in the bore within and outside of the linear response range.

The solutions proposed herein allow for increasing the STL ratio by extending the linearity of the output signals beyond the linear operating region, and arrangements with LVDTs configured accordingly may become suitable in situations where the limited space previously prevented their adoption. Even HSTL ratio LVDTs can benefit from the solution proposed according to the present disclosure.

The proposed process is scalable and can be replicated across a variety of LVDTs, each of which may have its own characteristics. This is a benefit, as does not constrain the proposed solution to specific devices or hardware implementations.

In some embodiments, the control unit may be configured to produce the output signals by evaluating an input dataset including at least one of a voltage of the primary coil, one or more voltages of the secondary coils, and a temperature of the LVDT using a trained artificial intelligence module. This allows for adapting the measures proposed herein to different mechanical configurations.

To account for electrical issues, a protection circuit design may also be provided according to the present disclosure, particularly to prevent possible damages to the LVDTs primary coil. Finally, the proposed process aligns with the approaches to model based design (MBD). Indeed, the process proposed herein allows the easy exchange, replication, and deployment of highly-specialized algorithms onto target hardware in a transparent manner.

That is, an arrangement as proposed may include a current limiter configured to limit the excitation current, the current limiter being connected between one or more driver terminals of a current source configured to supply the excitation current and one or more connection terminals of the primary coil.

According to the present disclosure, the displacement range may be larger than a range between the first end and the second end of the bore, and the plurality of positions may include positions outside the range between the first end and the second end of the bore. This further allows for the STL ratio to be extended and such a solution may particularly be realized in combination with a current limiter which avoids excessive currents in such a situation.

In an embodiment as proposed herein, means limiting a movement of the core beyond the first and/or the second end by more than a predetermined fraction of a length of the core may be provided. This allows for a safe operation and a limitation of the stroke to mechanically safe values.

In specific embodiments, the artificial intelligence module may be provided as an externally trained artificial intelligence module. This allows the supply of a number of, in particular technical identical, arrangements with the same artificial intelligence module, which can be trained on one or more representative test pieces.

The artificial intelligence module may particularly be trained using training data obtained for at least a subset of said plurality of positions. An artificial intelligence module trained accordingly may then be reliably determine all positions of the core from the electrical feature, parameter or characteristic within the movement range allowed for according to the present disclosure.

In some embodiments, obtaining said training data may include positioning said core at a plurality of training positions and using response data at least in part corresponding to the input data. This further improves the quality of the response provided by the artificial intelligence module.

Training data used according to some embodiments may be obtained for a plurality of operating conditions including, but not limited to, an operating temperature measured at one or more positions. This may particularly result in a wide range of conditions the arrangement can be reliably used.

A method of operating an arrangement comprising a LVDT including a core displaceable in a bore surrounded by a coil arrangement including a primary coil and secondary coils in a displacement range including a linear response range of the LVDT is also proposed. The bore at least extends between a first position at a first end of the coil arrangement and a second position at a second end of the coil arrangement, and a control unit configured to produce output signals corresponding to a plurality of positions of the core in the bore when an excitation current is supplied to the primary coil is provided.

The displacement range is larger than the linear response range, and the plurality of positions include positions outside the linear response range. Using the control unit, the output signals are provided as output signals indicating the plurality of positions of the core in the bore within and outside of the linear response range. Particularly, the output signals may be provided by evaluating an input dataset including at least one of a voltage of the primary coil, one or more voltages of the secondary coils, and a temperature of the LVDT proposed herein using a trained artificial intelligence module.

As to further details and to features of such a method, and of embodiments thereof, reference is made to the explanations above relating to the arrangement provided according to the present disclosure and embodiments thereof.

A method of training an artificial intelligence module for an input dataset is also provided to an aspect disclosed herein, the input dataset including at least one of a voltage of a primary coil, one or more voltages of secondary coils, and a temperature of a LVDT to provide output signals corresponding to a plurality of positions of a core in a bore of the LVDT when an excitation current is supplied to the primary coil, said method including providing training data obtained for at least a subset of said plurality of positions.

A trained artificial intelligence module, wherein the artificial intelligence module is trained by a corresponding method is also proposed, as well as a computer program with program code for performing a corresponding method when the computer program is run on a processor.

Like above, as to further details and to features of such a training method, such a trained artificial intelligence module, and such a computer program, and of corresponding embodiments, reference is made to the explanations above.

Embodiments of the arrangement proposed herein, and of corresponding methods will now be described by way of example only, with reference to the drawings. These embodiments may be provided in connection with a brake or brake pedal for an aircraft, such as in fly by wire applications, but it is well conceivable that the arrangement will find application in other brake systems or any other application which was referred to at the outset and other contexts.

DETAILED DESCRIPTION

Figure 1:
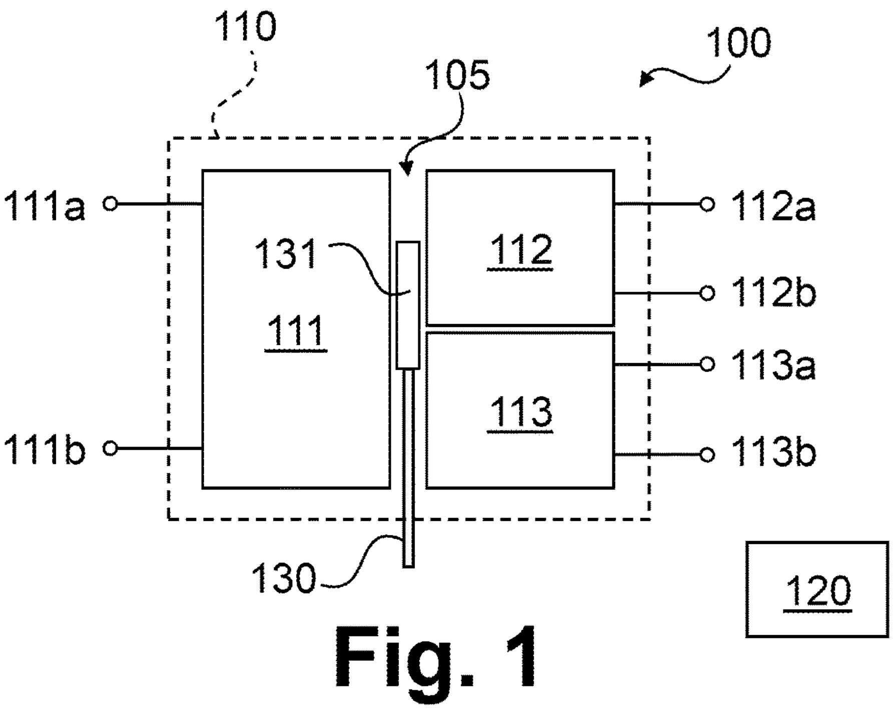
FIG. 1 schematically illustrates an arrangement including a LVDT.

In the Figures, elements of identical, essentially identical, functionally comparable, or technically compatible function and/or purpose may be identified with identical reference numerals, and repeated explanations may be omitted for reasons of conciseness. Explanations herein relating to devices, apparatus, arrangements, systems, etc., according to embodiments likewise may apply to methods, processes, procedures, etc. according to embodiments and vice versa.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future, particularly when encompassed by the scope of the independent claims.

The functioning of an LVDT typically relies on four main components, which are a primary coil, two secondary coils, and a movable, magnetically susceptible, particularly ferromagnetic, core.

The primary coil generates a magnetic field when powered with an AC signal at a given voltage and frequency. The internal core, due to its magnetic susceptibility, couples the magnetic field of the primary winding with the secondary ones. The intensity of the coupling depends on the position of the core inside the sensor. By coupling, the secondary coils produce a voltage (V1 for the first secondary winding and V2 for the second secondary winding) that can be stronger or weaker based on the core's position (and therefore coupling). The position of the core inside the sensor is generally determined by computing the voltage difference V1–V2, or the voltage difference V2–V1 (wherein the order is generally of no relevance).

Every LVDT is characterized by the so-called linear operating region, which was also referred to as "linear response range" above. This region or range represents the interval in which the different V1–V2 (or V2–V1) varies linearly with the moving of the core, the meaning of "linear" having already been elaborated on above. Beyond this linear operating region or response range, the difference V1–V2 (or V2–V1) behaves non-linearly, thus making it conventionally extremely difficult (or impossible) to relate the output voltage to the core's position. The present disclosure provides reliable and advantageous solution to this problem.

This limitation is primarily a result of the internal structure of the LVDT, which requires the provision of different coils to produce adequate magnetic fields to sense the position of the magnetic core. This aspect may conventionally prevent or limit the employment of such sensors where the overall available space is limited, and solutions as proposed herein may extend the use range. Aspects as disclosed herein include a generic methodology and process that can increase the HSTL ratio of Commercial and Off-The-Shelf (COTS) sensors.

FIG. 1 illustrates a view of an arrangement 100 including a LVDT 110 and a corresponding control unit 120. The arrangement 100 measures a relative position of a core 131 attached to a movable shaft 130 in relation to a primary coil 111 and secondary coils 112, 113 of the LVDT 110.

In practical realization, the secondary coils 112, 113 may be placed at the terminal ends of the primary coil 111, and the shaft 130 with its core 131 may be surrounded by the primary and secondary coils 111, 112, 113. The secondary coils 112, 113 may be arranged in series opposition connection, such that a differential voltage between the secondary coils 112, 113 may be used by the control unit 120 to determine the position of the core 131 when an excitation current is generated in the excitation coil 131 using a current source 114. However, different types of connections and voltage detection principles may be realized as well. Control and detection connections may be provided in any desired manner between the control unit 120, the current source 114, and a voltage sensor provided for the secondary coils 112, 113, as not shown for reasons of clarity. Terminals of the primary and secondary coils 111, 112, 113 are indicated with 111*a*, 111*b*, 112*a*, 112*b*, 113*a*, 113*b*, and these may be connected accordingly.

The moving element of the LVDT 110, which is illustrated as the core 131 in FIG. 1, may be a separate tubular armature of magnetically permeable material, which is free to move axially within a hollow bore 105 of the primary and secondary coils 111, 112, 113 and which is mechanically coupled to the object whose position is being measured via the shaft 130. This bore 105 is typically large enough to provide substantial radial clearance for the core 131, with no physical contact between it and the primary and secondary coils 111, 112, 113 for friction-less measurement and virtually infinite mechanical life.

Figure 2:
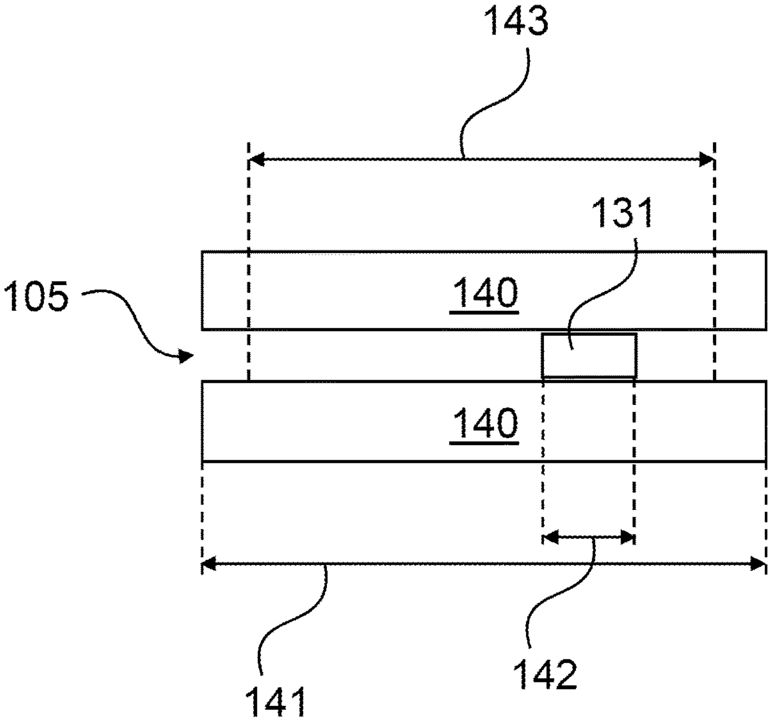
FIG. 2 schematically illustrates dimensions of an arrangement including a LVDT, FIGS. 3A and 3B schematically illustrate a positioning of a core in an arrangement including a LVDT, FIG. 4A schematically illustrates a positioning of a core in an arrangement including a LVDT in an extended range, FIG. 4B schematically illustrates a positioning of a core in an arrangement including a LVDT in a further extended range, FIG. 5 schematically illustrates an arrangement including a LVDT according to an embodiment, FIG. 6 schematically illustrates a digital signal processor usable in an arrangement according to an embodiment, and FIG. 7 schematically illustrates a configuration process for a digital signal processor usable in an arrangement according to an embodiment.

FIG. 2 illustrates certain dimensions for a LVDT 110, which is shown here in an even more generalized manner. A body 140 includes the primary and secondary coils, which are not illustrated for reasons of generality. The bore 105 is formed in the body 140. A length of the body 140, $L_{body}$, is indicated with a dimension arrow 141, while a length of the core 131 within the bore 105, $L_{core}$, is indicated with a dimension arrow 142. A stroke or stroke length, $L_{stroke}$, is conventionally limited as explained at the outset and is indicated with a dimension arrow 143, this range corresponding to the linear response range as explained above.

Figure 3A:
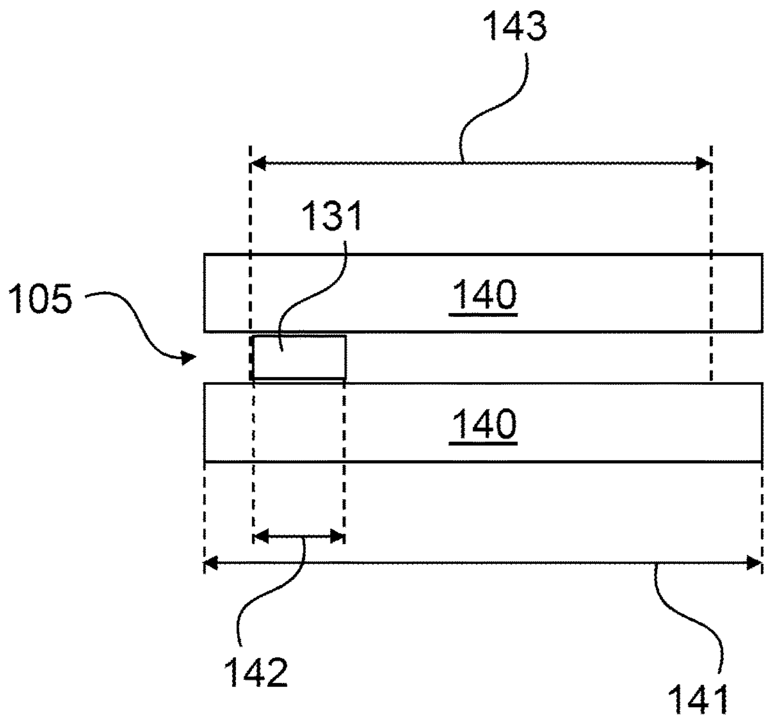
Figure 3B:
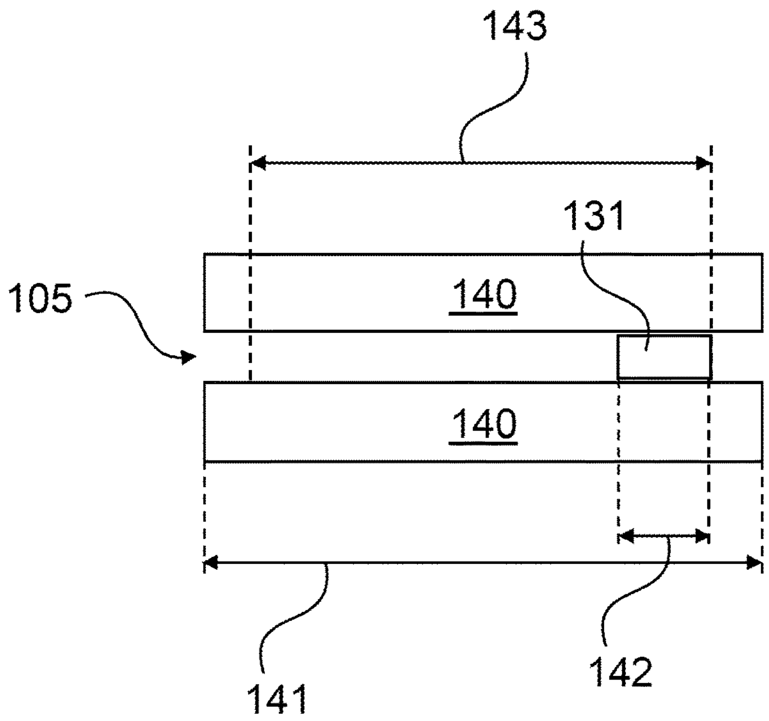

FIGS. 3A and 3B illustrate the extreme positions of the core 131 within the linear response range, i.e., stroke length $L_{stroke}$ or 143, where FIG. 3A illustrates a leftmost extreme position and FIG. 3B illustrates a rightmost extreme position. For further details, reference is made to the explanations in relation to FIG. 2.

Figure 4A:
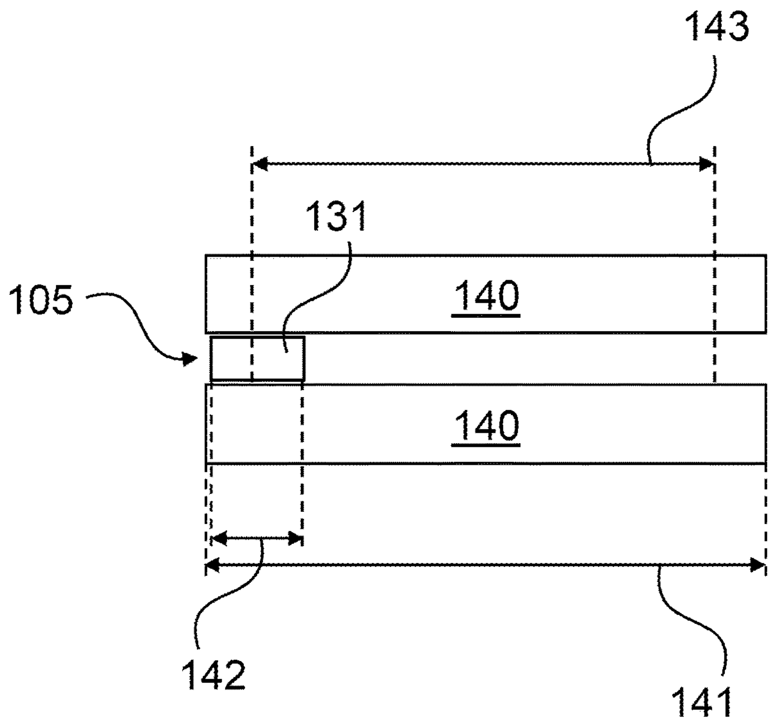
Figure 4B:
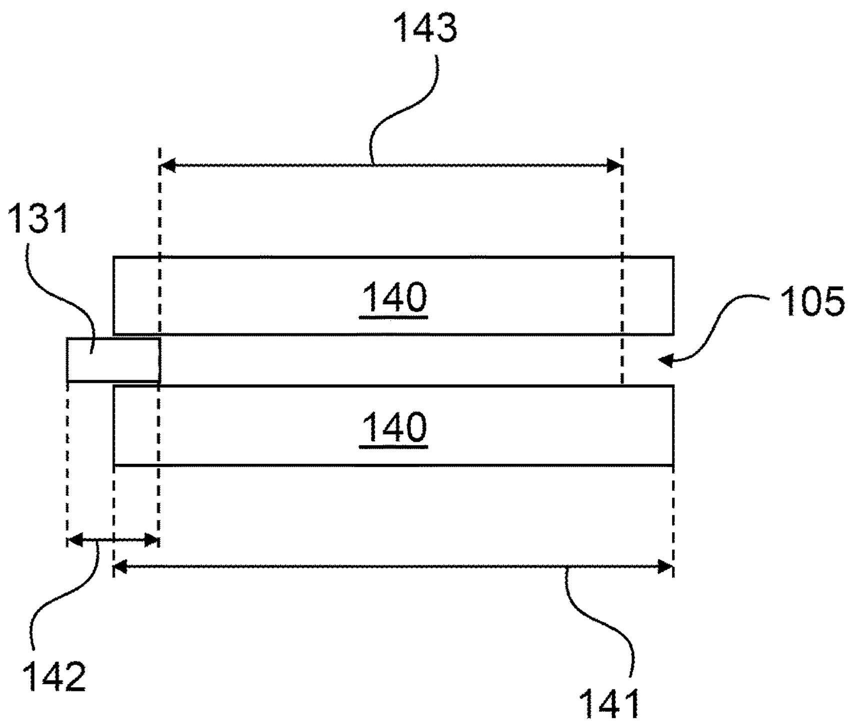

FIGS. 4A and 4B illustrate how the core 131 within the bore 105 can be placed beyond the limits of the linear response range, i.e., the (nominal) stroke length $L_{stroke}$ or 143, wherein according to FIG. 4A the core is still fully contained in the body 140 or its bore 105, e.g. fully surrounded by one of the secondary coils 112, 113, and according to FIG. 4B the core 131 is even placed partly beyond the limits of the body 140 or its bore 105, such that only a fractional part (in the example half) of the core length, i.e. $L_{core}/2$, as illustrated by dimensional arrow 144, is placed within the body 140 or its bore 105.

As can be seen from FIGS. 4A and 4B, additional stroke can be recovered if the core is allowed to travel outside the linear response range, i.e., the nominal stroke, or even the bore 105, for a given quantity. For any LVDT 110, it is possible to quantify the percentage stroke increase realized according to measures such as illustrated in FIGS. 4A and 4B according to $$\left(\frac{L_{body}}{L_{stroke}} - 1\right) \cdot 100\,[\%].$$

Conventionally, the extraction of the core 131 from the internal bore 105 is strongly advised against, as this may cause high currents in the primary coil 111 due to a drop of internal impedances generated by the core 131. However, a proper design of electronics, as proposed herein, can help in preventing this issue.

Such an electronics design, which serves to implement a circuit protection, is discussed hereinbelow in an example. This design allows the core 131 of the linear LVDT 110 to travel beyond the bore 105 or partly outside the body 140 while avoiding overcurrent issues.

Figure 5:
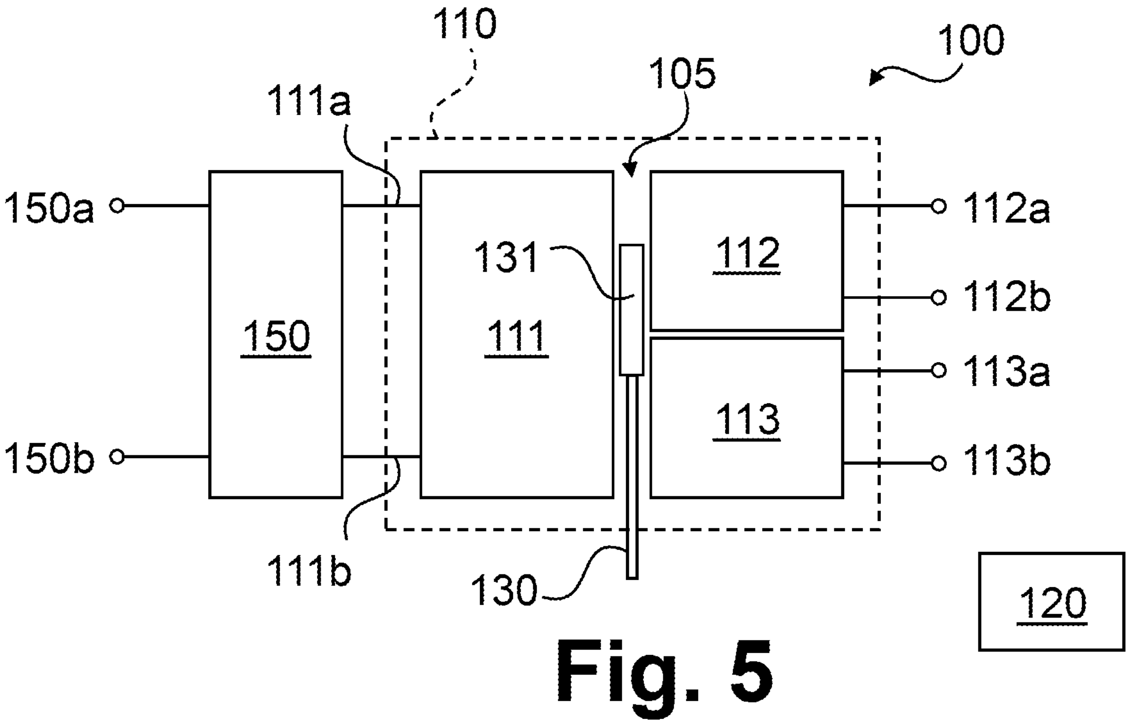

The concept is explained in FIG. 5, where an arrangement 100 including a linear LVDT 110 is illustrated, the illustration partly corresponding to FIG. 1.

In order to avoid excessive currents flowing through the primary coil 111, which could lead to excessive heat generation and damage, a current limiter 150 is shown to be arranged between the excitation signal to the LVDT 110, as may be applied to terminals 150*a* and 150*b*, and the terminals 111*a*, 111*b* of the primary coil 111. This current limiter 150, which can be implemented with COTS devices like field-effect transistors or integrated circuits, ensures that the maximum current that can be drawn from the LVDT 110 is limited to a parameter-dependent value. Such value can particularly be decided at design stage, particularly based on the maximum ratings of the LVDT 110.

The electronics protection circuit as illustrated in form of the current limiter 150 in FIG. 5 may be further supported by means of mechanical constraints, as schematically illustrated with a block 132 which may be, e.g., a bracket, plate, or any other similar element suitable for limiting movement of core 131, affixed to a housing of the LVDT, and which may be provided in all embodiments shown in the Figures, to lock the allowed movements of the core 131 in a confined space.

Figure 6:
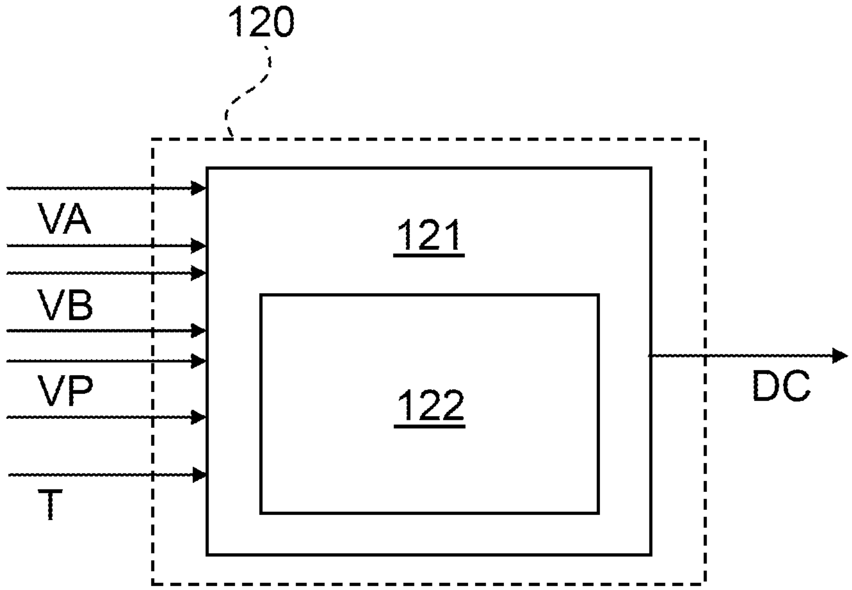

A further aspect is a digital signal processor 121 as will now be described with reference to FIG. 6. As illustrated in FIG. 6, digital signal processor 121 may be provided internally to the control unit 120 or separately therefrom. Digital signal processor 121 may include an artificial intelligence module 122.

As illustrated in FIG. 6, the digital signal processor may take as inputs quantities including a primary coil voltage signal, VP, such as measured at terminals 111*a*, 111*b*, secondary coils signals, VA and VB, such as measured at terminals 112*a*, 112*b* and 113*a*, 113*b*, and a temperature signal, T, of the LVDT 110. Additional inputs not listed may also be considered. As an output, the digital signal processor may provide a signal which may be an output voltage, DC, that may span linearly within a pre-defined interval as a function of the input quantities or otherwise correspond thereto.

Internally, the digital signal processor 121 may implement artificial Intelligence methods or units that are capable of mapping the defined inputs over a desired output. For example, a neural network may be used for this purpose. The neural network may be externally trained and then deployed onto an embedded device as which the control unit 120, or a part thereof, may be provided. To achieve the training objective, a suitable dataset may be collected.

A test bench may be executed to collect the required data. In particular, a target linear LVDT, such as described before for LVDT 110 (with defined $L_{body}$, $L_{stroke}$, $L_{core}$, etc.), can be excited on a work bench. Through the usage of a suitable device (e.g., linear sliding actuator), the core 131 of the LVDT 110 can be mechanically displaced. The actuator may push the core 131 beyond the length of the body 140 of the LVDT 110 (according to defined limits). The direction and speed of these changes can be made arbitrary. A proper design of experiment (DOE) may be performed to ensure covering the entire spectrum of possible displacements. Systems bandwidth and mechanical constraints may be anyway considered.

The linear actuator, or other displacement means, sets the position of the core 131 of the LVDT 110 (e.g. named TARGET). As a function of the displacement of the core 131, output data (e.g. named COVARIATES) may be collected, which may include the VA and VB voltages, the VP voltage, a phase lag between VP and VA/VB, an impedance of the primary coil 111, and a temperature of the LVDT 110, see FIG. 6, which can be varied across different experiments.

The collected dataset may be used to train a neural network or other artificial intelligence module that maps the observed quantities onto the position of the core 131. In particular, the neural network or other artificial intelligence module may be designed to take as input the COVARIATES and predict the TARGET profile (i.e., predict the core position as a function of VA, VB, etc.). Validation procedures may be carried out by comparing the prediction accuracy of the trained neural network or other artificial intelligence module, over a different dataset (i.e., cross validation).

It shall be noted in this connection that the set of COVARIATES represents an example; additional indices (not strictly related to the LVDT 110) may be collected during the test process. Once the validation accuracy reaches acceptable values, the resulting neural network or other artificial intelligence module can be directly deployed onto the control unit 120 and interfaced with the analogue signals.

Figure 7:
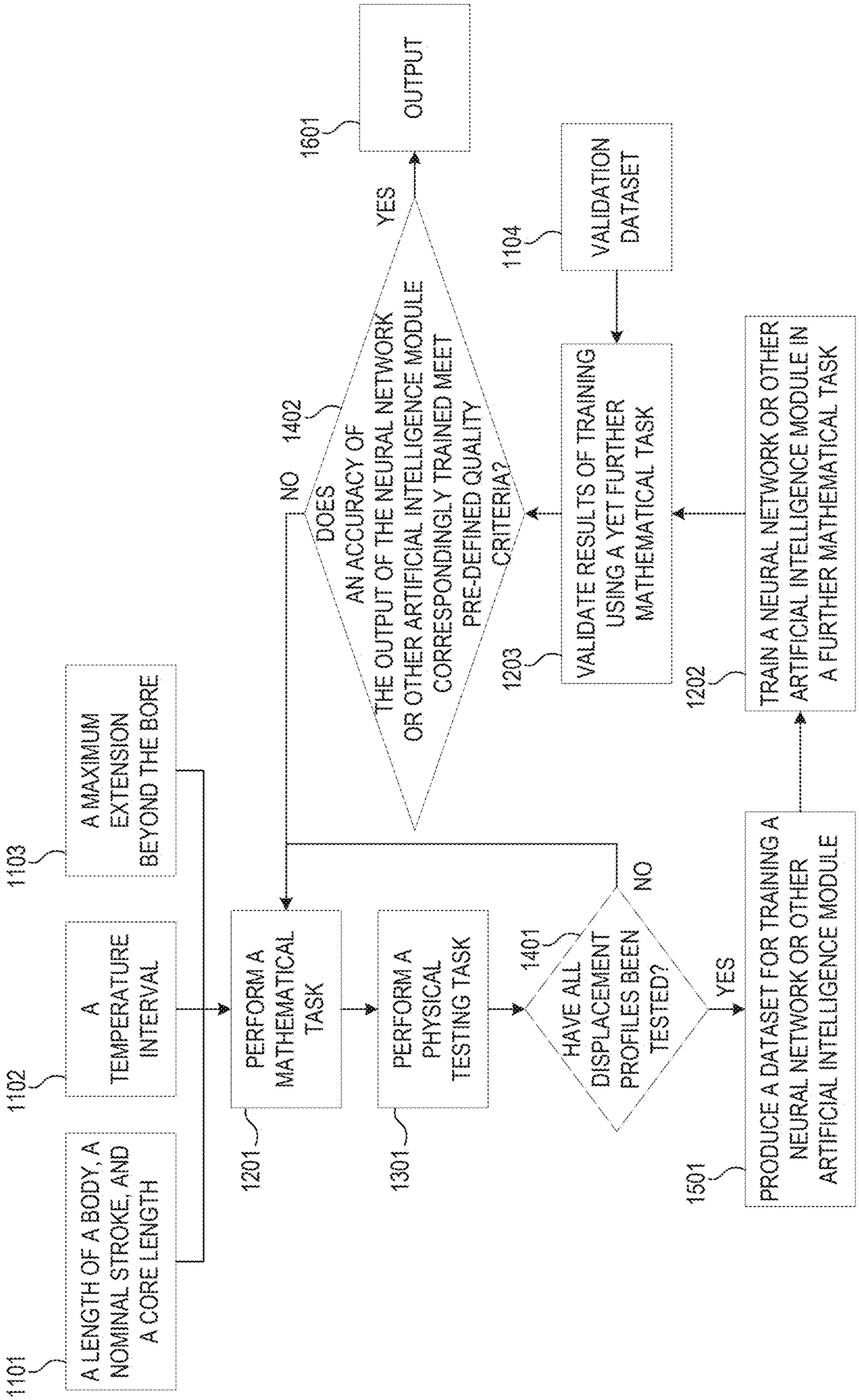

A corresponding process is depicted in FIG. 7 in the form of a process flow scheme. In this process, input parameters 1101, 1102, 1103 relate to a length of a body 140, a nominal stroke, and a core length, to a temperature interval, and to a maximum extension beyond the bore 105, for example. A further input 1104, discussed below, is provided as a validation dataset.

Hereinbelow, different "tasks" forming part of the process are referred to. Such tasks may be performed essentially or predominantly in hardware, such as on a test site or using test pieces, in which cases such tasks are referred to as "physical testing tasks". Tasks being rather, essentially or predominantly, performed in software or in silico, i.e. on the basis of mathematical equations or computations are referred to as "mathematical tasks". The term "communication task" relates to a task in which different elements or subprocesses interact, e.g., by transferring data such as computation or testing results or optimized algorithms provided by physical or mathematical tasks. Reference to tasks as being physical, mathematical, or communication tasks is done merely for explanation purposes and not intended to limit the scope of the invention.

The term "mathematical task", in particular, may be used as an umbrella term for different procedures performed algorithmically, i.e., in software. The term is not intended to be limited to specific calculation methods or levels of complexity. Examples of appropriate mathematical procedures are given below in each case when referring to particular tasks. The person skilled in the art will select a suitable realization on the basis of common general knowledge. For example, a skilled person can make use of known software libraries for mathematical modelling and calculations of any kind and commonly available or specifically adapted artificial intelligence modules. Calculations performed when executing a mathematical task may be performed on a local computer or control device or on a remote server or computer network (i.e., in a cloud).

On the basis of the input parameters 1101, 1102, 1103, a mathematical task 1201 is performed which comprises, or consists of, the mathematical generation of displacement profiles. The displacement profiles are subjected to a physical testing task 1301 which may include or consist of automatically testing the displacement of the core 131, e.g. using a linear actuator.

In particular, the generation of displacement profiles included in mathematical task 1201 may include modelling an LVDT, i.e., calculations based on a digital or software model of the LVDT under examination. Any level of complexity or any level of simplification may be used in a corresponding model. For example, model complexity may be determined in an adaptive manner, wherein a comparison of a behavior of the model used and a behavior of a real-life LVDT may be made at any point of an optimization procedure to determine or increase the suitability of the model. For example, optimizing a model may start with a relatively simple model and adding additional complexity only as needed may increase reliability without unnecessarily increasing the computational or modelling effort. For mathematical modelling, in particular, and for specific models that may be used in the context of the present disclosure, the skilled person may resort to expert or textbook literature, such as Heiliö, M., "Mathematical Modelling", Springer, 2016.

For example, a digital twin of a LVDT may be used for modelling at a comparatively high complexity level. A digital twin is generally understood to be a digital representation of a tangible or intangible object from the real world in the digital world. It is generally irrelevant whether the real-world object already exists or will exist in the future. Therefore, a digital twin may be used in the design stage of real-world objects already and may streamline a development process. A digital twin may comprise one or more models of the represented object and can also contain simulations, algorithms and services that describe or influence the properties or behavior of the represented object. On the other end of the spectrum of models that may be used in the context of the present disclosure are comparatively simple mathematical models describing outputs to certain inputs (such as a current for certain displacement) on a very basic level including constraints such as, but not limited to, an operation temperature.

If, in a decision block 1401, it has been found that all displacement profiles have been tested, in a communication task 1501, a dataset for training a neural network or other artificial intelligence module is produced. If not, the process returns to the production of a further displacement profile in mathematical task 1201.

On the basis of the dataset produced in communication task 1501, a neural network or other artificial intelligence module is trained in a further mathematical task 1202. Results of said training are validated using a yet further mathematical task 1203 using the validation dataset 1104 mentioned above.

Further mathematical task 1202, as mentioned, particularly includes training an artificial intelligence module. As to the understanding of the term "artificial intelligence module", reference is made to the explanations below, and any step, component, program module, or hardware module including artificial intelligence or machine learning may be used in this connection.

Mathematical task 1203 particularly may include validation of the outputs of the artificial intelligence modules using a model of the LVDT which may be the same or a different one than that used in mathematical task 1201, and therefore the same explanations apply. Validation may also be performed using different validation steps including validation using one or more mathematical models of LVDT devices and using one or more real-world LVDT devices. Outputs of one or more validation steps in mathematical task 1203 may be compared or combined in any way or mathematically offset against each other, e.g., using weighting factors, to produce an output suitable for determining a quality of the artificial intelligence module.

If, in a decision block 1402, it has been found that an accuracy of the output of the neural network or other artificial intelligence module correspondingly trained meets pre-defined quality criteria. If this is the case, a process output 1601 is provided and the corresponding neural network or other artificial intelligence module may be deployed to a digital signal processor 121 or other unit of a control unit 120. If this is not the case, the process returns to the production of the mathematical task 1201 of generating the displacement profiles.

Some or all the steps of methods according to some embodiments as disclosed herein may be performed (or used) by a hardware device such as, for example, a processor, a microprocessor, a programmable computer, or an electronic circuit.

Depending on certain implementation requirements, some embodiments may be implemented by either hardware or software or both. The implementation may be carried out using a non-transitory storage medium, such as a digital storage medium like an optical data carrier, ROM, PROM, EPROM, EEPROM, or FLASH memory, with electronically readable control signals recorded thereon that interact, or are capable of interacting, with a programmable computer system in a manner that executes an appropriate method. In this manner, the digital medium can be computer readable according to embodiments.

Some embodiments may include a data carrier having electronically readable control signals stored thereon that can interact with a programmable computer system such that one of the processes described herein is executed. In general, some embodiments may be implemented as a computer program product with program code, the program code being operative to perform one of the processes when the computer program product is executed on the computer. The program code may, for example, be stored on a machine-readable medium. Other embodiments may include a computer program for performing one of the processes described herein stored on a machine-readable medium.

In other words, some embodiments relate to a computer program having program code for performing one of the methods described herein when the computer program is executed on a computer. Some embodiments may also relate a storage medium (or data medium or computer readable medium) having stored a computer program for performing one of the methods according to some embodiments when executed by a processor. The data carrier, digital medium or recorded medium may, in some embodiments as disclosed herein, generally be tangible and/or non-transitory. Some other embodiments relate to a device as described herein comprising a processor and a storage medium.

Some other embodiments relate to a data stream or sequence of signals representing a computer program for performing one of the processes described herein. The data stream or signal sequence may, for example, be configured to be transmitted via a data connection, for example over the internet. Yet another embodiment includes a processing means, such as a computer or programmable logic device configured or adapted to perform any of the processes described herein. Yet another embodiment includes a computer on which a computer program is installed to perform any of the processes described herein.

Yet other embodiments include a device or system configured to transmit (e.g., electronically, or optically) a computer program for performing one of the processes described herein to a receiver. The receiver may be, for example, a computer, a mobile device, a memory device, or the like. The device or system may, for example, include a file server to transmit the computer program to the receiver. In some embodiments, a programmable logic device (e.g., a field programmable gate array) may be used to perform all or part of the functionality of the methods described herein. In some embodiments, the programmable gate array may communicate with a microprocessor to perform any of the methods described herein. In general, the methods are preferably executed by any hardware device.

Implementation options and some embodiments can be based on the use of an artificial intelligence module or a machine learning algorithm. The terms "artificial intelligence module" is used herein for any step, component, program module, or hardware module including artificial intelligence or machine learning.

Machine learning can refer to algorithms and statistical modules that computer systems or a digital signal processor or any other suitable component forming part of a system can use to perform a given task without explicit instructions, relying instead on modules and inference.

For example, machine learning may use a data transformation derived from analysis of historical and/or training data instead of a rule-based data transformation. For example, coil voltages and temperatures may be analyzed using an artificial intelligence module or algorithm. For an artificial intelligence module to analyze such values, and operating conditions as indicated above, the artificial intelligence module may be trained with corresponding input data as training data and known position information as output data.

By training the artificial intelligence module accordingly, the artificial intelligence module may "learn", in some embodiments, to associate features of input data, or the overall result of a processing step performed on the basis of the input data, to positions of a core in a LVDT arrangement, so that data not included in the training data can be recognized by the artificial intelligence module. Training data may be provided in any form conceivable and processable by artificial intelligence module.

Artificial intelligence modules can be trained using training data, as mentioned. Some embodiments may use a training method called supervised learning. In supervised learning, an artificial intelligence module is trained using a set of training patterns, where each pattern may contain a set of input data values and a set of desired output values, i.e., each training pattern is associated with a desired output value. By specifying training patterns and desired output values, the artificial intelligence module "learns" which output value to provide based on an input pattern that is similar to the patterns provided during training.

In addition to, or alternatively to, supervised learning, semi-supervised learning can also be used in some embodiments. In semi-supervised learning, some training patterns do not have a corresponding desired output value. Supervised learning can be based on a supervised learning algorithm (e.g., a classification algorithm, a regression algorithm, or a similarity learning algorithm). Classification algorithms may be used when the output values are restricted to a limited set of values in the form of categorical variables, i.e., the input data is assigned to one of a limited set of values. Regression algorithms can be used when the outputs can have any numerical value within a range. Similarity learning algorithms, which can be used in some embodiments, can resemble classification and regression algorithms, but are based on learning by example using a similarity function that measures how similar or related two objects are. In addition to, or alternatively to, supervised or semi-supervised learning, unsupervised learning can also be used in some embodiments to train an artificial intelligence module. In unsupervised learning, (only) input data can be provided, and the unsupervised learning algorithm can be used to find structure in the input data (e.g., by grouping or clustering the input data, searching for commonalities in the data). Clustering is the division of input data consisting of multiple input values into subsets (clusters) such that the input values within a cluster are similar according to one or more (given) similarity criteria, while they are different from the input values in other clusters.

Reinforcement learning is a third group of machine learning algorithms, which can be used in some embodiments. In other words, reinforcement learning can be used to train an artificial intelligence module in certain embodiments. In reinforcement learning, one or more so-called software agents are trained to perform actions in an environment. Rewards are calculated based on the actions performed. In reinforcement learning, one or more software agents are trained to select actions that increase their overall rewards, making the software agents better at the task at hand, resulting in higher rewards.

In addition, some techniques can be applied to some machine learning algorithms according to some embodiments. For example, feature learning can be applied. In other words, the artificial intelligence module can be trained at least partially by feature learning and/or the machine learning algorithm can include a feature learning component. The feature learning algorithms, which may also be referred to as view learning algorithms, store the information in the input but may also transform it to make it useful, often as a pre-processing step before performing classification or prediction. Feature training, for example, may be based on principal component analysis or cluster analysis.

In some examples, anomaly detection (i.e., outlier detection) may be used to identify suspect input values that deviate significantly from most input or training data. In other words, the artificial intelligence module may be trained at least in part using anomaly detection and/or the machine learning algorithm may include an anomaly detection component.

In some examples, the machine learning algorithm may use a decision tree as a predictive module. In other words, the artificial intelligence module may be based on a decision tree. In a decision tree, observations about an element (e.g., a set of input values) can be represented by branches of the decision tree, and the output value corresponding to the element can be represented by the leaves of the decision tree. Decision trees can support both discrete and continuous values as output values. When discrete values are used, the decision tree can be called a classification tree; when continuous values are used, the decision tree can be called a regression tree.

Associative rules are another technique that can be used in machine learning algorithms. In other words, an artificial intelligence module can be based on one or more association rules. Association rules are created by finding relationships between variables in large data sets. A machine learning algorithm may define and/or use one or more relational rules that represent knowledge extracted from the data. For example, rules may be used to store, manipulate, or apply knowledge.

Machine learning algorithms are typically based on an artificial intelligence module. In other words, the term "machine learning algorithm" can refer to a set of instructions that can be used to create, teach, or use an artificial intelligence module. The term "artificial intelligence module" may therefore refer to a data structure and/or set of rules that represent learned knowledge (e.g., based on learning performed by a machine learning algorithm). In some embodiments of the invention, the use of a machine learning algorithm may include the use of an underlying artificial intelligence module (or multiple underlying artificial intelligence modules). The use of an artificial intelligence module may mean that the artificial intelligence module and/or the data structure/set of rules representing the artificial intelligence module have been trained by the machine learning algorithm.

In an embodiment, an artificial intelligence module could be an artificial neural network (ANN). Artificial neural networks are systems that mimic biological neural networks, such as those found in the retina or brain. Artificial neural networks may comprise a large number of interconnected nodes and a large number of connections, called edges, between the nodes. In general, there are three types of nodes, (1) input nodes that receive input values; (2) hidden nodes that are connected (only) to other nodes, and (3) output nodes that produce output values. Each node can represent an artificial neuron. Each edge can transmit information from one node to another. The output of a node can be defined as a (nonlinear) function of its inputs (e.g., the sum of its inputs). The inputs of a node can be used in a function based on the "weight" of the edge or node providing the input. The weights of nodes and/or edges can be adjusted during training. In other words, training an artificial neural network may particularly, and in certain embodiments, involve adjusting the weights of the nodes and/or edges of the artificial neural network, i.e., achieving the desired output for a given input.

Additionally, or alternatively, an artificial intelligence module may be or include a support vector machine, a random forest module, or a gradient boosting module in some embodiments. Support vector machines (i.e., support vector networks) are supervised learning modules with appropriate learning algorithms that can be used for data analysis (e.g., classification or regression analysis). Reference vector machines can be trained by providing a set of training input values that belong to one of two categories in some embodiments. A support vector machine can be trained to assign a new input value to one of the two categories. Additionally, or alternatively, in some embodiments the artificial intelligence module may represent or include a Bayesian network, i.e., a probabilistic, directed, acyclic graph module. A Bayesian network can represent a set of random variables and their conditional dependencies as a directed acyclic graph. Additionally, or alternatively, the artificial intelligence module may be based on a genetic algorithm, a search algorithm, and a heuristic that mimics the process of natural selection.

What is claimed is:

1. An arrangement comprising:

a linear variable differential transformer including a core displaceable in a bore provided in a body and surrounded by a coil arrangement including a primary coil and secondary coils in a displacement range including a linear response range of the linear variable differential transformer, wherein the bore at least extends between a first position at a first end of the coil arrangement and a second position at a second end of the coil arrangement, and wherein the arrangement comprises a control unit configured to produce output signals corresponding to a plurality of positions of the core in the bore when an excitation current is supplied to the primary coil, wherein the displacement range is larger than the linear response range, wherein the plurality of positions include positions outside the linear response range, wherein the control unit is configured to produce the output signals as output signals indicating the plurality of positions of the core in the bore within and outside of the linear response range, wherein the core is configured to travel beyond at least one of the bore or partly outside the body, wherein the control unit is configured to produce the output signals by or on the basis of evaluating an input dataset including a temperature of the linear variable differential transformer using a trained artificial intelligence module, wherein the trained artificial intelligence module comprises a neural network including input nodes, hidden nodes, output nodes, and edges between the nodes, and wherein weights of at least one of the input nodes, the hidden nodes, the output nodes, or the edges are adjusted during training, the weights adjusted to achieve a desired output for a given input.

2. The arrangement according to claim 1, wherein the input dataset further includes at least one of a voltage of the primary coil and one or more voltages of the secondary coils and wherein the input dataset further includes at least one of a phase lag between the voltage of the primary coil and the one or more voltages of the secondary coils and an impedance of the primary coil.

3. The arrangement according to claim 1, further including a current limiter configured to limit the excitation current, the current limiter being connected between one or more driver terminals of a current source configured to supply the excitation current and one or more connection terminals of the primary coil.

4. The arrangement according to claim 1, wherein the displacement range is larger than a range between the first end and the second end of the bore and wherein the plurality of positions include positions outside the range between the first end and the second end of the bore.

5. The arrangement according to claim 4, further comprising means limiting a movement of the core beyond the first and/or the second end by more than a predetermined fraction of a length of the core.

6. The arrangement according to claim 1, wherein the trained artificial intelligence module is provided as an externally trained artificial intelligence module.

7. The arrangement according to claim 1, wherein the trained artificial intelligence module is trained using training data obtained for at least a subset of the plurality of positions.

8. The arrangement according to claim 7, wherein obtaining the training data includes positioning the core at a plurality of training positions and using response data at least in part corresponding to the input dataset.

9. The arrangement according to claim 7, wherein the training data are obtained for a plurality of operating conditions.

10. The arrangement according to claim 1, wherein the control unit includes a digital signal processor configured to receive as inputs at least a primary coil voltage signal, secondary coil signals, and a temperature signal, and to provide as an output a signal that spans linearly within a pre-defined interval as a function of the inputs.

11. A method of operating an arrangement comprising an open-core linear variable differential transformer including:

a core displaceable in a bore provided in a body and surrounded by a coil arrangement including a primary coil and secondary coils in a displacement range including a linear response range of the linear variable differential transformer, wherein the bore at least extends between a first position at a first end of the coil arrangement and a second position at a second end of the coil arrangement, wherein a control unit configured to produce output signals corresponding to a plurality of positions of the core in the bore when an excitation current is supplied to the primary coil is provided, wherein the displacement range is larger than the linear response range, wherein the plurality of positions include positions outside the linear response range, wherein using the control unit, the output signals are provided as output signals indicating the plurality of positions of the core in the bore within and outside of the linear response range, wherein the core is configured to travel beyond at least one of the bore or partly outside the body, wherein the control unit is configured to produce the output signals by or on the basis of evaluating an input dataset including a temperature of the linear variable differential transformer using a trained artificial intelligence module, wherein the trained artificial intelligence module comprises a neural network including input nodes, hidden nodes, output nodes, and edges between the nodes, and wherein weights of at least one of the input nodes, the hidden nodes, the output nodes, or the edges are adjusted during training, the weights adjusted to achieve a desired output for a given input.

12. The method according to claim 11, wherein the input dataset further includes at least one of a voltage of the primary coil and one or more voltages of the secondary coils and wherein the input dataset further includes at least one of a phase lag between the voltage of the primary coil and the one or more voltages of the secondary coils and an impedance of the primary coil.

13. A computer program with program code for performing a method according to claim 11 when the computer program is run on a processor.

* * * * *